United States Patent
Seki et al.

(10) Patent No.: US 10,916,357 B2
(45) Date of Patent: Feb. 9, 2021

(54) ALUMINUM ALLOY FOIL FOR ELECTRODE COLLECTOR AND PRODUCTION METHOD THEREFOR

(75) Inventors: Masakazu Seki, Chiyoda-ku (JP); Satoshi Suzuki, Chiyoda-ku (JP); Kenji Yamamoto, Chuo-ku (JP); Tomohiko Furutani, Chuo-ku (JP)

(73) Assignee: UACJ Corporation, Tokyo (JP)

( * ) Notice: Subject to any disclaimer, the term of this patent is extended or adjusted under 35 U.S.C. 154(b) by 380 days.

(21) Appl. No.: 14/235,748

(22) PCT Filed: Jul. 29, 2011

(86) PCT No.: PCT/JP2011/067479
§ 371 (c)(1),
(2), (4) Date: Jan. 28, 2014

(87) PCT Pub. No.: WO2013/018164
PCT Pub. Date: Feb. 7, 2013

(65) Prior Publication Data
US 2014/0261908 A1    Sep. 18, 2014

(51) Int. Cl.
| | | |
|---|---|---|
| H01B 1/02 | (2006.01) | |
| C22F 1/043 | (2006.01) | |
| C22F 1/04 | (2006.01) | |
| H01M 4/66 | (2006.01) | |
| C22C 1/02 | (2006.01) | |
| C22C 21/00 | (2006.01) | |
| B22D 11/06 | (2006.01) | |
| B22D 11/12 | (2006.01) | |
| B22D 25/04 | (2006.01) | |
| C22F 1/00 | (2006.01) | |
| B22D 11/00 | (2006.01) | |
| H01G 11/68 | (2013.01) | |
| H01B 1/00 | (2006.01) | |
| H01M 10/052 | (2010.01) | |

(52) U.S. Cl.
CPC ........... *H01B 1/023* (2013.01); *B22D 11/003* (2013.01); *B22D 11/0622* (2013.01); *B22D 11/1206* (2013.01); *B22D 25/04* (2013.01); *C22C 1/026* (2013.01); *C22C 21/00* (2013.01); *C22F 1/00* (2013.01); *C22F 1/04* (2013.01); *C22F 1/043* (2013.01); *H01G 11/68* (2013.01); *H01M 4/662* (2013.01); *H01M 10/052* (2013.01); *Y02E 60/13* (2013.01)

(58) Field of Classification Search
CPC ............. C22F 1/04; C22F 1/043; H01B 1/023
See application file for complete search history.

(56) References Cited

U.S. PATENT DOCUMENTS

| | | | | |
|---|---|---|---|---|
| 4,000,009 A | * | 12/1976 | Chatfield ................... | C22F 1/04 148/551 |
| 4,953,875 A | * | 9/1990 | Sudit ........................ | F41J 5/044 273/373 |
| 5,466,312 A | * | 11/1995 | Ward, Jr. ............ | B22D 11/0611 148/438 |
| 2004/0086417 A1 | | 5/2004 | Baumann | |
| 2006/0216600 A1 | * | 9/2006 | Inagaki .................... | H01M 2/06 429/231.1 |
| 2007/0059592 A1 | * | 3/2007 | Takami ................... | H01M 2/06 429/161 |
| 2008/0130202 A1 | * | 6/2008 | Ro ........................ | H01G 9/0425 361/516 |
| 2013/0059184 A1 | * | 3/2013 | Sasakawa ............. | H01M 2/263 429/94 |

FOREIGN PATENT DOCUMENTS

| | | |
|---|---|---|
| JP | 03-291363 A | 12/1991 |
| JP | 11-140609 A | 5/1999 |
| JP | 11-162470 A | 6/1999 |
| JP | 2000-038632 A | 2/2000 |
| JP | 2001-288525 A | 10/2001 |
| JP | 2004-207117 A | 7/2004 |
| JP | 2005-273005 A | 10/2005 |
| JP | 2009-19248 A | 1/2009 |
| JP | 2010-043333 A | 2/2010 |

(Continued)

OTHER PUBLICATIONS

Aluminium Handbook, issued by Japan Aluminium Association, Jan. 31, 2007, 4 pages. English translation of relevant portions of Aluminium Handbook in Japanese Information Statement, filed herewith.
Ashizawa, K., and K. Yamamoto, "Aluminum Foil for Lithium-Ion Battery," Furukawa-Sky Review No. 5, Apr. 2009, 6 pages.
Japanese Information Statement, submission of reason details, filed by a third party May 1, 2015, 20 pages.
International Search Report dated Oct. 25, 2011, issued in corresponding International Application PCT/JP2011/067479, filed Jul. 29, 2011, 2 pages.
Extended European Search Report dated Jul. 25, 2014, issued in corresponding European Application No. 11 87 0456.8, filed Jul. 29, 2011, 5 pages.

*Primary Examiner* — Lois L Zheng

(74) *Attorney, Agent, or Firm* — Christensen O'Connor Johnson Kindness PLLC

(57) ABSTRACT

An object of the present invention is to provide an aluminum alloy foil for an electrode current collector and a manufacturing method thereof, the foil having a high strength and high strength after a drying process after the application of the active material while keeping a high electrical conductivity. Disclosed is a method for manufacturing an aluminum alloy foil for electrode current collector, including: forming by continuous casting an aluminum alloy sheet containing 0.03 to 1.0% of Fe, 0.01 to 0.2% of Si, 0.0001 to 0.2% of Cu, with the rest being Al and unavoidable impurities, performing cold rolling to the aluminum alloy sheet at a cold rolling reduction of 80% or lower, and performing heat treatment at 550 to 620° C. for 1 to 15 hours.

2 Claims, No Drawings

(56) References Cited

FOREIGN PATENT DOCUMENTS

JP  2010-150637 A  7/2010
JP  4523390 B2  8/2010

\* cited by examiner

ALUMINUM ALLOY FOIL FOR ELECTRODE COLLECTOR AND PRODUCTION METHOD THEREFOR

TECHNICAL FIELD

The present invention relates to an aluminum alloy foil suitable for electrode materials used for secondary batteries, electric double-layer capacitors, lithium-ion capacitors, etc., and more particularly to aluminum alloy foils used for a positive electrode material of lithium-ion secondary batteries, aluminum alloy foils used for a negative electrode material of lithium-ion secondary batteries, and manufacturing methods for these alloy foils.

BACKGROUND ART

Lithium-ion secondary batteries with high energy densities have been used as power sources for portable electronics such as a mobile phone and a notebook computer.

An electrode member of a lithium-ion secondary battery includes a positive electrode plate, a separator, and a negative electrode plate. Regarding a positive electrode material, an aluminum alloy foil has been used as a support, having excellent electrical conductivity and less heat generation without affecting electrical efficiency of a secondary battery. An active material having a lithium-containing metal oxide such as $LiCoO_2$ as a chief component is applied on a surface of the aluminum alloy foil. Its production process includes: applying an active material with a thickness of about 100 µm on both sides of an aluminum alloy foil with a thickness of about 20 µm; and providing a heat treatment which dries the active material to remove a solvent therefrom (hereinafter referred to as drying process). Further, in order to increase the density of the active material, compression forming is performed with a pressing machine (hereinafter, this step of compression forming performed with a pressing machine is referred to as press working). The positive electrode plate as so manufactured, a separator, and a negative electrode plate are stacked, and then the resulting stack is wound. After a shaping process is performed so as to encase the stack, it is encased.

An aluminum alloy foil used for an electrode material of a lithium-ion secondary battery has several problems that cuts occur during application of an active material and that ruptures occur at a bending portion during winding. Thus, a higher strength is required. In particular, heat treatment is carried out at about 100 to 180° C. in the drying process. Accordingly, when the strength after the drying process is low, the aluminum alloy foil is easily deformed during press working. This induces wrinkles during winding, which reduces adhesion between the active material and the aluminum alloy foil. Besides, a rupture is likely to occur during a slitting process. When the adhesion between the active material and a surface of the aluminum alloy foil decreases, their detachment is facilitated during repeated operation of discharge and charge. Unfortunately, this causes its battery capacity to decrease.

Recently, a high electrical conductivity has been also required for an aluminum alloy foil used for an electrode material of a lithium-ion secondary battery. What is meant by the electrical conductivity refers to physical property indicating how easily electricity is conducted in a substance. The higher the electrical conductivity is, the more easily the electricity is conducted. Lithium-ion secondary batteries used for automobiles and/or electric tools necessitate a higher output characteristic than lithium-ion secondary batteries used for consumer-use mobile phones and/or notebook computers. When a large current flows, a lower electrical conductivity causes internal resistance of a battery to increase. Consequently, this reduces its output voltage. Accordingly, the aluminum alloy foils used for the lithium-ion secondary batteries require high strength for both the foil before and after the drying process, and high electrical conductivity.

Aluminum alloy foils for lithium ion secondary batteries are generally manufactured by semi-continuous casting. In the semi-continuous casting, an ingot is obtained by casting aluminum alloy molten metal. Then, the obtained ingot is subject to hot rolling and cold rolling to give an aluminum sheet (foil material) having a thickness of about 0.2 to 0.6 mm, followed by foil rolling to give the aluminum alloy foil having a thickness of about 6 to 30 µm. Here, homogenization treatment of the ingot and intermediate annealing in the midst of the cold rolling are also generally performed as necessary.

In the continuous casting, a cast sheet is obtained by casting and rolling the aluminum alloy molten metal continuously. Therefore, in the continuous casting, the homogenization treatment of the ingot and the hot rolling, which are the essential steps in the semi-continuous casting, can be omitted. Therefore, yield and energy efficiency can be improved, achieving low manufacturing cost. The typical continuous casting includes twin roll continuous casting and belt continuous casting. The cooling speed of the molten metal in these continuous casting is faster than that in the semi-continuous casting. Therefore, the elements added to the aluminum are forced to form solid solution in a supersaturated manner, and the intermetallic compounds precipitate uniform and fine crystals. In addition, the cast sheet after the continuous casting can obtain high electrical conductivity by performing heating treatment in the midst of the cold rolling, thereby allowing the supersaturated solid solution of Fe to precipitate. As a result, when compared with the aluminum alloy foil manufactured by the semi-continuous casting, the aluminum alloy foil manufactured by the continuous casting is low in cost, has higher strength and higher strength after heat treatment, and has high electrical conductivity.

Patent Literature 1 discloses an aluminum alloy material having excellent corrosion resistance, containing only Fe and having an intermetallic compound with a maximum length of 2.0 µm or longer and aspect ratio of 3 or more distributed by 30 particles/10000 (µm)$^2$. However, since there is no limitation with respect to the amount of Si, the intermetallic compound which precipitate during the continuous casting is likely to become large, which results in decrease in the particle number of uniform and fine intermetallic compound that contribute to improvement in strength. Although Patent Literature 1 is silent from any particular disclosure with respect to the electrode material, if an aluminum foil is used as the aluminum alloy foil for lithium ion secondary battery, the strength after heat treatment, which simulates a drying process, would be low. This strength is insufficient since the adhesion between the active material and the aluminum alloy foil decreases and the aluminum alloy foil becomes prone to ruptures during a slitting process because the aluminum alloy foil is easily deformed during press working.

Patent Literature 2 discloses an aluminum alloy foil for electrode current collectors used in lithium ion battery, which is manufactured by the semi-continuous casting and has a strength of 160 MPa or higher. However, the strength after heat treatment, which simulates a drying process, would be low. This strength is insufficient since the adhesion between the active material and the aluminum alloy foil decreases and the aluminum alloy foil becomes prone to ruptures during a slitting process because the aluminum alloy foil is easily deformed during press working.

CITATION LIST

Patent Literature

[Patent Literature 1] U.S. Pat. No. 4,523,390
[Patent Literature 2] JP2010-150637A

SUMMARY OF INVENTION

Technical Problem

The present invention has been made by taking the afore-mentioned circumstances into consideration. An object of the present invention is to provide an aluminum alloy foil for an electrode current collector and a manufacturing method thereof, the foil having a high strength and high strength after the drying process while keeping a high electrical conductivity.

Solution to Problem

The present inventors have made an investigation regarding the aluminum alloy foil used for the electrode materials of the lithium-ion secondary batteries. Accordingly, the present inventors found that high strength can be maintained after the heat treatment during the drying process, by regulating the content of the component within an appropriate range and by manufacturing the foil by continuous casting.

That is, the first aspect of the preset invention is an aluminum alloy foil for electrode current collector preferably manufactured by continuous casting, comprising:

0.03 to 1.0 mass % (hereinafter referred to as %) of Fe, 0.01 to 0.2% of Si, 0.0001 to 0.2% of Cu, with the rest consisting of Al and unavoidable impurities, wherein the electrical conductivity of the aluminum alloy foil is 57% IACS or higher, and a particle number of an intermetallic compounds having a maximum diameter length of 0.1 to 1.0 μm is $1.0 \times 10^4$ particles/mm$^2$ or more.

The second aspect of the present invention is a method for manufacturing an aluminum alloy foil for an electrode current collector, comprising the steps of:

forming by continuous casting an aluminum alloy sheet comprising 0.03 to 1.0% of Fe, 0.01 to 0.2% of Si, 0.0001 to 0.2% of Cu, with the rest consisting of Al and unavoidable impurities, performing cold rolling to the aluminum alloy sheet at a cold rolling reduction of 80% or lower, and performing heat treatment at 550 to 620° C. for 1 to 15 hours.

The following points were considered to be particularly important when achieving the present invention. That is, the following conditions of (1) aluminum alloy sheet containing three elements of Fe, Si, and Cu shall be formed by continuous casting, and (2) the aluminum alloy sheet shall be subjected to cold rolling followed by heat treatment at 550 to 620° C. for 1 to 15 hours, need be satisfied. The most important point is that the content of Si is specified to be in the range of 0.01 to 0.2%. From the results of the examinations conducted by the present inventors, it became apparent that the intermetallic compound which precipitates by the heat treatment becomes large as the content of Si increases, and when the content exceeds 0.2%, decrease in the particle number of the crystals of fine intermetallic compound, which has large contribution to the improvement in strength of the fine aluminum alloy foil, is observed, while increase in the number of the crystals of intermetallic compound having a length of 2.0 μm or longer, which has only small contribution to the improvement in strength, is observed. By regulating the content of Si to 0.01 to 0.2%, a large number of crystals of fine intermetallic compound became distributed uniformly. Accordingly, the inventors of the present invention have obtained an aluminum alloy foil having high strength and high electrical conductivity.

Advantageous Effects of Invention

According to the present invention, an aluminum alloy foil for electrode current collector, such as an aluminum alloy foil for lithium ion batteries, having high strength after a drying process after the application of the active material, can be provided. Such aluminum alloy foil is resistant from deformation during press working, thereby preventing detachment of the active material and raptures during a slitting process.

DESCRIPTION OF EMBODIMENTS

Composition of Aluminum Alloy Foil

The aluminum alloy foil for an electrode current collector according to the present invention comprises: 0.03 to 1.0% of Fe, 0.01 to 0.2% of Si, 0.01 to 0.2% of Cu, with the rest consisting of Al and unavoidable impurities.

Fe is an element that increases strength by addition thereof, and 0.03 to 1.0% of Fe is included. When the additive amount of Fe is less than 0.03%, there is no contribution to the improvement in strength. On the other hand, when the additive amount of Fe exceeds 1.0%, coarse intermetallic compounds of Al—Fe based compound or Al—Fe—Si based compound easily crystallize during the continuous casting, which leads to unfavorable phenomena of cut during the rolling and generation of pinholes.

Si is an element that increases strength by addition thereof, and 0.01 to 0.2% of Si is included. When the additive amount of Si is less than 0.01%, there is no contribution to the improvement in strength. In addition, Si is included in a common aluminum based metal as impurities. As a result, in order to restrict the amount to less than 0.01%, a high-purity base metal should be used. This is difficult to achieve in view of economic reasons. On the other hand, when the additive amount of Si exceeds 0.2%, the size of the intermetallic compound crystallized during the continuous casting becomes large, resulting in the decrease in the particle number of the fine intermetallic compound which contributes to the improvement in strength. Accordingly, the strength of the aluminum alloy foil decreases.

Cu is an element that increases strength by addition thereof, and 0.0001 to 0.2% of Cu is included. In order to restrict the additive amount of Cu to less than 0.0001%, a high-purity base metal should be used. This is difficult to achieve in view of economic reasons. On the other hand, when the additive amount of Cu exceeds 0.2%, the work hardening increases, thereby becoming prone to cut during the foil rolling.

With regard to other points, a material of an embodiment of the present invention contains unavoidable impurities such as Ti, Cr, Ni, B, Zn, Mn, Mg, V, and/or Zr. An amount of each of the unavoidable impurities is preferably 0.02% or less, and a total amount thereof is preferably 0.15% or less.

<Original Sheet Strength>

With regard to an aluminum alloy primarily containing Fe, Si and Cu, when each of the elements are dissolved in the aluminum alloy as much as possible and the crystals of the intermetallic compound formed during the continuous casting is dispersed uniformly and finely, dislocation movement can be reduced, thereby achieving higher strength. Further, since the cooling speed is faster in the continuous casting than the semi-continuous casting and rolling, the content of the solid solution for each of the elements increase, and thus the work hardening during processing increase. Accordingly, strength of the aluminum alloy foil can be further improved by cold rolling and foil rolling.

Tensile strength of an original sheet after final cold rolling is preferably 180 MPa or higher. Then, 0.2% yield strength thereof is preferably 160 MPa or higher. When the tensile strength is less than 180 MPa and the 0.2% yield strength is less than 160 MPa, the strength is insufficient. Consequently, tension imposed during application of an active material is likely to produce cuts and cracks.

<Strength after Heat Treatment>

A step of manufacturing a positive electrode plate includes a drying process after application of an active material so as to remove a solvent from the active material. At this drying process, heat treatment is carried out at a temperature of about 100 to 180° C. This heat treatment may cause a change in mechanical property because an aluminum alloy foil is softened. Thus, the mechanical property of the aluminum alloy foil after the heat treatment is critical. During heat treatment at 100 to 180° C., external heat energy activates dislocation and facilitates its movement. This decreases strength in the course of recovery thereof. In order to prevent the strength decrease in the course of the recovery during the heat treatment, reducing the dislocation movement by solid-solution elements or precipitates of intermetallic compound finely dispersed in the aluminum alloy is effective.

In the present invention, it is preferable that the tensile strength is 170 MPa or higher and 0.2% yield strength is 150 MPa or higher after heat treatment at 120° C. for 24 hours, at 140° C. for 3 hours, or at 160° C. for 15 minutes. The strength after the heat treatment of the present invention is greatly affected by the intermetallic compound which is crystallized during the continuous casting. The faster the cooling speed during the continuous casting, the more the fine intermetallic compound is crystallized, thereby improving the strength after the heat treatment. When the aforementioned tensile strength after heat treatment is lower than 170 MPa and 0.2% yield strength is lower than 150 MPa, the aluminum alloy foil is easily deformed during the press working after the drying process. This strength is insufficient since the adhesion between the active material and the aluminum alloy foil decreases and the aluminum alloy foil becomes prone to ruptures during a slitting process.

<Intermetallic Compound>

Intermetallic compounds having a maximum diameter length of 0.1 to 1.0 μm exist at the surface of the aluminum alloy foil, and the particle number of such intermetallic compound is $1.0 \times 10^4$ particles/mm² or more. These intermetallic compounds are Al—Fe based or Al—Fe—Si based, and are finely crystallized during continuous casting. These fine intermetallic compounds improve the strength of the aluminum alloy foil by dispersion strengthening, while preventing the decrease in strength after the heat treatment.

When the particle number of the intermetallic compounds having a maximum diameter length of 0.1 μm or shorter is less than $1.0 \times 10^4$ particles/mm², contribution to the dispersion strengthening is small, and thus the strength decreases. The intermetallic compounds having a maximum diameter length of longer than 1.0 μm have small contribution to the improvement in strength, and may become a trigger point of pinholes. Therefore, it is preferable to suppress such intermetallic compound. In addition, in order to enhance the dispersion strengthening by these intermetallic compound, the shape of the intermetallic compound becomes important. To suppress the dislocation movement during the drying process after the application of the active material, it is preferable that the aspect ratio, defined as the ratio of the long diameter of the intermetallic compound against the short diameter of the intermetallic compound, is 3 or less. The particle number of the intermetallic compound can be counted by observing the surface of the aluminum alloy foil using scanning electron microscope (SEM). In particular, the surface of the aluminum alloy foil is subjected to electropolishing to give a mirror state. Then, the reflected electron image is observed at a magnification of 1000 times for 30 visual fields. The particle number of the intermetallic compound is quantified by using an image analyzing device. The longer side of the intermetallic compound which is observed as a two dimensional shape in the visual field of the reflected electron image is defined as the maximum diameter length of the intermetallic compound.

From these point of views, it is preferable that the particle number of the intermetallic compounds having a maximum diameter length of 2.0 μm or longer and an aspect ratio of 3 or more is less as possible. The particle number of such intermetallic compound is preferably less than $2.2 \times 10^3$ particles/mm², and more preferably less than $1.2 \times 10^3$ particles/mm².

<Electrical Conductivity>

Electrical conductivity should be 57% IACS or higher. The electrical conductivity represents a solid solution state of a solute element, particularly of Fe, Si and the like. The electrical conductivity of the present invention is greatly affected by the temperature and by the holding time of the heat treatment performed at a high temperature after the continuous casting. When the temperature of the heat treatment is low and the holding time is long, more of Fe, Si and the like that were dissolved in a supersaturated manner would precipitate, thereby improving electrical conductivity. In the case where the electrode current collector of the present invention is used for the lithium-ion secondary batteries, when a discharge rate exceeds 5 C, which is a high current level, electrical conductivity of less than 57% IACS is not preferable because its battery capacity decrease. Note that the "1 C" means a current level to complete, in one hour, the discharge from a cell having the nominal capacity value when a constant current at the current level is discharged from the cell.

<Continuous Casting and Rolling>

The aluminum alloy molten metal having the aforementioned composition is subjected to continuous casting and rolling to obtain a cast sheet. Typical continuous casting includes twin roll continuous casting and twin belt continuous casting. The twin roll continuous casting and rolling is a method which includes feeding of the aluminum alloy molten metal from a fire-resistive supply nozzle in between water cooled rolls facing each other, followed by continuous casting and rolling into a thin sheet. 3 C method, hunter method and the like are used in the industry. The twin belt continuous casting includes feeding the molten metal in between a pair of opposing upper and lower water-cooled circulating belts, followed by solidifying of the molten metal by cooling the molten metal with the surface of the belts, thereby continuously casting and rolling into a thin sheet. The present invention may adopt either one of the twin roll continuous casting or the twin belt continuous casting, and shall not be limited to a particular manufacturing method. Here, the twin roll continuous casting requires shorter time for the cooling when compared with the twin belt continuous casting, resulting in more fine crystals of the intermetallic compound, thereby achieving aluminum alloy foil with higher performance. Hereinafter, a manufacturing method using the twin roll continuous casting is described as one example of the continuous casting.

The temperature of the molten metal when casting by the twin roll continuous casting is preferably in the range of 680 to 800° C. The temperature of the molten metal is the temperature of the head box located immediately before the supply nozzle. When the temperature of the molten metal is lower than 680° C., intermetallic compound is formed in the supply nozzle and becomes mixed into the sheet ingot, thereby causing cut in the sheet during cold rolling. When the temperature of the molten metal exceeds 800° C., the aluminum alloy molten metal does not solidify sufficiently in between the rolls during the casting, and thus normal cast sheet cannot be obtained. The thickness of the cast sheet after the continuous casting is 20 mm or less. When the thickness of the sheet exceeds 20 mm, the solidifying speed during the continuous casting becomes slow, coarsening the crystals of the intermetallic compound, thereby decreasing the particle number of the fine intermetallic compound which contributes to the dispersion strengthening.

<Heat Treatment after Continuous Casting and Rolling>

Cold rolling under rolling reduction ratio of 80% or lower is performed with the cast sheet obtained by the continuous casting and rolling, followed by heat treatment at 550 to 620° C. for 1 to 15 hours. The cast sheet after the continuous casting contains a large amount of solid solution of various additive elements. In particular, Fe is dissolved in a super-saturated manner, and thus the electrical conductivity is low. Therefore, by performing the heat treatment at a high temperature, Fe and Si which are dissolved in a supersaturated manner can partially precipitate, thereby improving the electrical conductivity.

When the rolling reduction ratio of the cold rolling performed after the continuous casting and rolling exceeds 80%, the amount of cold rolling reduction from the thickness right after the heat treatment (at 550 to 620° C. for 1 to 15 hours) to the final thickness of the foil decreases. This results in reduction in accumulated strain and thus brings the unfavorable decrease in the strength of the final aluminum alloy foil. In addition, when the temperature of the heat treatment is lower than 550° C., more of the Fe dissolved in a supersaturated manner would precipitate, and the solid solution content of Fe decreases, which results in unfavorable decrease in strength. When the temperature of the heat treatment exceeds 620° C., the aluminum alloy sheet becomes prone to local melting, which is unfavorable. When the holding time is shorter than 1 hour, precipitation of the Fe dissolved in a supersaturated manner would not proceed, thereby resulting in unfavorable decrease in the electrical conductivity. When the holding time exceeds 15 hours, the cast sheet would occupy the heat treatment furnace for a long time. This is unfavorable from the viewpoint of productivity and cost. After performing the afore-mentioned heating treatment, cold rolling and foil rolling are performed to give the aluminum alloy foil. Here, the method for performing the cold rolling and the foil rolling are not particularly limited.

In addition, the rolling reduction ratio of the cold rolling with respect to the cast sheet is preferably 20% or higher, and more preferably 50% or higher. When the rolling reduction ratio is too low, the amount of accumulated strain becomes less. This results in insufficient precipitation of Fe and Si that are dissolved in a supersaturated manner, which is unfavorable since it becomes difficult to obtain high electrical conductivity.

<Thickness of the Aluminum Alloy Foil>

After the final cold rolling, the aluminum alloy foil should have a thickness of 6 to 30 μm. When the thickness is less than 6 μm, pin holes are likely to occur during foil rolling. This situation is not preferable. When the thickness exceeds 30 μm, the volume and weight of an electrode current collector increase and the volume and weight of an active material decrease in the same occupied space. In the case of a lithium-ion secondary battery, the above is not preferable because a battery capacity decreases.

EXAMPLES

The present invention will be explained in details by referring to the following Examples 1 to 12. The Examples, however, are just examples, and thus the present invention shall not be limited to the Examples.

Cast sheet with a thickness of 8 mm was prepared by the twin roll continuous casting using the aluminum alloy molten metal having the composition shown in Table 1. The cast sheet after the continuous casting was subjected to cold rolling under the rolling reduction ratio shown in Table 1, followed by heat treatment. After the heat treatment, cold rolling and foil rolling were continuously performed to give the aluminum alloy foil with the thickness of 15 μm.

Regarding Comparative Examples 13 to 19, aluminum alloy foils with the thickness of 15 μm was obtained by the twin roll continuous casting with the conditions shown in Table 1, in a similar manner as the Examples. In Comparative Examples 20 and 21, ingots with the thickness of 500 mm were cast by a conventional manufacturing method of semi-continuous casting. Subsequently, homogenization treatment at 500° C. for 1 hour was performed, followed by hot rolling to give a cast sheet with the thickness of 4 mm. Then, cold rolling was performed until the thickness reached 0.8 mm, followed by intermediate annealing at 300° C. for 4 hours using a batch furnace. After the intermediate annealing, cold rolling and foil rolling were performed continuously to give the aluminum alloy foil with the thickness of 15 μm.

TABLE 1

| | No. | Method of Casting | Chemical Component (mass. %) | | | | High Temperature Heat Treatment Conditons | | | Foil Thickness (μm) |
|---|---|---|---|---|---|---|---|---|---|---|
| | | | Si | Fe | Cu | Al and Unavoidable Impurities | Cold Rolling Reduction Ratio(%) | Retention Temperature (° C.) | Holding Time (hr) | |
| Example | 1 | Twin Roll | 0.03 | 0.06 | 0.009 | Rest | 55 | 600 | 7 | 15 |
| | 2 | Continuous | 0.07 | 0.32 | 0.02 | Rest | 65 | 600 | 5 | 15 |
| | 3 | Casting | 0.13 | 0.44 | 0.03 | Rest | 60 | 620 | 10 | 15 |
| | 4 | | 0.13 | 0.44 | 0.03 | Rest | 60 | 550 | 10 | 15 |
| | 5 | | 0.16 | 0.79 | 0.16 | Rest | 75 | 580 | 7 | 15 |
| | 6 | | 0.16 | 0.79 | 0.16 | Rest | 25 | 580 | 7 | 15 |
| | 7 | | 0.01 | 0.06 | 0.0008 | Rest | 65 | 620 | 5 | 15 |
| | 8 | | 0.03 | 0.03 | 0.01 | Rest | 55 | 620 | 7 | 15 |
| | 9 | | 0.02 | 0.05 | 0.0002 | Rest | 50 | 620 | 10 | 15 |
| | 10 | | 0.19 | 0.68 | 0.09 | Rest | 65 | 550 | 7 | 15 |
| | 11 | | 0.14 | 0.96 | 0.15 | Rest | 80 | 550 | 10 | 15 |
| | 12 | | 0.12 | 0.48 | 0.19 | Rest | 80 | 550 | 15 | 15 |
| Comparative | 13 | Twin Roll | 0.22 | 0.11 | 0.0007 | Rest | 65 | 560 | 5 | 15 |
| Example | 14 | Continuous | 0.02 | 0.01 | 0.0008 | Rest | 65 | 560 | 5 | 15 |
| | 15 | Casting | 0.18 | 1.50 | 0.12 | Rest | 65 | 560 | 5 | 15 |
| | 16 | | 0.17 | 0.85 | 0.3 | Rest | 65 | 560 | 5 | 15 |
| | 17 | | 0.03 | 0.05 | 0.0011 | Rest | 95 | 560 | 5 | 15 |
| | 18 | | 0.08 | 0.28 | 0.02 | Rest | 65 | 500 | 5 | 15 |
| | 19 | | 0.14 | 0.63 | 0.12 | Rest | 65 | 560 | 0.5 | 15 |
| | 20 | Semi-continuous | 0.03 | 0.06 | 0.009 | Rest | Homogenizing Treatment 500° C. × 1 hr | | | 15 |
| | 21 | Casting | 0.13 | 0.44 | 0.03 | Rest | Intermediate annealing 300° C. × 4 hr | | | 15 |

Next, each aluminum alloy foil was used to prepare a positive electrode material for a lithium-ion secondary battery. PVDF as a binder was added to an active material primarily containing $LiCoO_2$ to yield the positive electrode slurry. This positive electrode slurry was applied on both surfaces of the aluminum alloy foil with a width of 30 mm. Then, the resulting aluminum alloy foil was subjected to heat treatment for drying under three different conditions including 120° C. for 24 hours, 140° C. for 3 hours, and 160° C. for 15 minutes. After that, a roller press machine was used to perform compression forming to increase the density of the active material.

Each aluminum alloy foil as so manufactured was used to measure and evaluate: the tensile strength, 0.2% yield strength, electrical conductivity, particle number of the intermetallic compound, number of cuts occurred during foil rolling, and number of pin holes; the tensile strength and 0.2% yield strength after the heat treatment at 120° C. for 24 hours; the tensile strength and 0.2% yield strength after the heat treatment at 140° C. for 3 hours; and the tensile strength and 0.2% yield strength after the heat treatment at 160° C. for 15 minutes. Table 2 shows the results. In addition, occurrence of cut during the active material application step and the occurrence of detachment of active material were observed for each positive electrode materials. Table 3 shows the results.

TABLE 2

| | | Aluminum Alloy Foil | | | | | | | | | | | | | |
|---|---|---|---|---|---|---|---|---|---|---|---|---|---|---|---|
| | | Original Sheet Strength | | Electrical Conductivity | Number of Intermetallic Compounds | | | Pinhole | | Heating at 120° C. for 24 Hours | | Heating at 140° C. for 3 Hours | | Heating at 160° C. for 15 Minutes | |
| | No. | Tensile Strength (N/mm²) | 0.2% Yield Strength (N/mm²) | (% IACS) | A (× 10⁴ particles/ mm²) | B (× 10³ particles/ mm²) | Cut During Rolling | Density (× 10⁻³ pinholes/ m²) | | Tensile Strength (N/mm²) | 0.2% Yield Strength (N/mm²) | Tensile Strength (N/mm²) | 0.2% Yield Strength (N/mm²) | Tensile Strength (N/mm²) | 0.2% Yield Strength (N/mm²) |
| Example | 1 | 204 | 187 | 62.1 | 1.2 | 0.3 | No | 0.3 | | 198 | 180 | 201 | 182 | 203 | 185 |
| | 2 | 216 | 190 | 61.0 | 1.5 | 0.4 | No | 0.3 | | 192 | 171 | 200 | 176 | 208 | 181 |
| | 3 | 244 | 218 | 58.1 | 1.3 | 0.6 | No | 0.3 | | 216 | 189 | 225 | 201 | 233 | 207 |
| | 4 | 218 | 182 | 60.2 | 1.6 | 0.6 | No | 0.6 | | 183 | 156 | 196 | 165 | 207 | 174 |
| | 5 | 286 | 250 | 58.9 | 1.9 | 0.8 | No | 0.3 | | 254 | 221 | 265 | 229 | 273 | 238 |
| | 6 | 291 | 255 | 57.8 | 1.8 | 0.8 | No | 0.6 | | 259 | 228 | 270 | 235 | 279 | 243 |
| | 7 | 185 | 166 | 62.6 | 1.4 | 0.1 | No | 0.3 | | 180 | 161 | 182 | 162 | 183 | 164 |
| | 8 | 195 | 173 | 62.8 | 1.1 | 0.2 | No | 0.3 | | 188 | 169 | 189 | 170 | 194 | 172 |
| | 9 | 182 | 163 | 62.5 | 1.2 | 0.2 | No | 0.3 | | 175 | 156 | 176 | 155 | 178 | 160 |
| | 10 | 271 | 225 | 57.4 | 2.4 | 1.1 | No | 0.6 | | 236 | 198 | 244 | 206 | 257 | 215 |
| | 11 | 286 | 242 | 57.1 | 2.5 | 1.0 | No | 0.8 | | 241 | 202 | 255 | 214 | 273 | 227 |
| | 12 | 301 | 259 | 57.9 | 1.8 | 0.8 | No | 0.3 | | 269 | 222 | 281 | 234 | 292 | 246 |

TABLE 2-continued

Aluminum Alloy Foil

| | No. | Original Sheet Strength Tensile Strength (N/mm²) | Original Sheet Strength 0.2% Yield Strength (N/mm²) | Electrical Conductivity (% IACS) | Number of Intermetallic Compounds A (× 10⁴ particles/ mm²) | Number of Intermetallic Compounds B (× 10³ particles/ mm²) | Cut During Rolling | Pinhole Density (× 10⁻³ pinholes/ m²) | Heating at 120° C. for 24 Hours Tensile Strength (N/mm²) | Heating at 120° C. for 24 Hours 0.2% Yield Strength (N/mm²) | Heating at 140° C. for 3 Hours Tensile Strength (N/mm²) | Heating at 140° C. for 3 Hours 0.2% Yield Strength (N/mm²) | Heating at 160° C. for 15 Minutes Tensile Strength (N/mm²) | Heating at 160° C. for 15 Minutes 0.2% Yield Strength (N/mm²) |
|---|---|---|---|---|---|---|---|---|---|---|---|---|---|---|
| Comparative Example | 13 | 178 | 160 | 61.4 | 0.8 | 3.1 | No | 0.8 | 181 | 138 | 184 | 140 | 171 | 149 |
| | 14 | 170 | 146 | 62.4 | 0.7 | 0.3 | No | 0.3 | 157 | 138 | 163 | 142 | 166 | 142 |
| | 15 | 220 | 184 | 57.1 | 2.3 | 2.9 | No | 3.3 | 187 | 156 | 198 | 167 | 211 | 175 |
| | 16 | 329 | 283 | 57.3 | 1.8 | 1.1 | Yes | 0.8 | 286 | 247 | 301 | 263 | 316 | 271 |
| | 17 | 163 | 146 | 62.8 | 1.1 | 0.4 | No | 0.3 | 145 | 129 | 152 | 135 | 158 | 141 |
| | 18 | 175 | 153 | 60.6 | 1.2 | 0.7 | No | 0.3 | 151 | 133 | 156 | 141 | 167 | 146 |
| | 19 | 264 | 221 | 56.4 | 1.5 | 0.9 | No | 0.6 | 227 | 188 | 239 | 201 | 250 | 212 |
| | 20 | 160 | 141 | 63.8 | 0.2 | 2.3 | No | 0.3 | 134 | 112 | 145 | 121 | 152 | 133 |
| | 21 | 176 | 155 | 60.9 | 0.5 | 3.7 | No | 0.3 | 142 | 121 | 156 | 131 | 163 | 140 |

A: Maximum Diameter Length 0.1 to 1.0 μm
B: Maximum Diameter Length 2.0 μm or Longer and Aspect Ratio 3 or Higher

TABLE 3

Positive Electrode Material

| | No. | Heating at 120° C. for 24 Hours Cut during Active-material-application Step | Heating at 120° C. for 24 Hours Detachment of Active Material | Heating at 140° C. for 3 Hours Cut during Active-material-application Step | Heating at 160° C. for 15 minutes Cut during Active-material-application Step | Heating at 160° C. for 15 minutes Detachment of Active Material | Heating at 160° C. for 15 minutes Cut during Active-material-application Step |
|---|---|---|---|---|---|---|---|
| Example | 1 | No | No | No | No | No | No |
| | 2 | No | No | No | No | No | No |
| | 3 | No | No | No | No | No | No |
| | 4 | No | No | No | No | No | No |
| | 5 | No | No | No | No | No | No |
| | 6 | No | No | No | No | No | No |
| | 7 | No | No | No | No | No | No |
| | 8 | No | No | No | No | No | No |
| | 9 | No | No | No | No | No | No |
| | 10 | No | No | No | No | No | No |
| | 11 | No | No | No | No | No | No |
| | 12 | No | No | No | No | No | No |
| Comparative Example | 13 | Yes | Yes | Yes | Yes | No | No |
| | 14 | Yes | Yes | Yes | Yes | Yes | Yes |
| | 15 | No | No | No | No | No | No |
| | 16 | No | No | No | No | No | No |
| | 17 | Yes | Yes | Yes | Yes | Yes | Yes |
| | 18 | Yes | Yes | Yes | Yes | Yes | Yes |
| | 19 | No | No | No | No | No | No |
| | 20 | Yes | Yes | Yes | Yes | Yes | Yes |
| | 21 | Yes | Yes | Yes | Yes | Yes | Yes |

<Tensile Strength and 0.2% Yield Strength>

The tensile strength of the aluminum alloy foil which had been cut out in a direction of the rolling was measured with an Instron tension tester AG-10kNX, manufactured by Shimadzu Corporation. The measurement was performed under conditions with a test piece size of 10 mm×100 mm, at a chuck distance of 50 mm, and at a crosshead speed of 10 mm/min. In addition, in order to simulate the drying process, heat treatment at 120° C. for 24 hours, at 140° C. for 3 hours, or at 160° C. for 15 minutes was carried out. Then, the aluminum alloy foil was cut out in a direction of the rolling. After that, the tensile strength was measured in the same manner as in the above. In addition, 0.2% yield strength was determined from a stress/strain curve.

<Electrical Conductivity>

With regard to electrical conductivity, electrical resistivity was measured by a four-terminal method, and was converted to electrical conductivity. The electrical conductivity of 57% IACS or higher was considered acceptable and the electrical conductivity of less than 57% IACS was determined as unacceptable.

<Particle Number of the Intermetallic Compound>

The particle number of the intermetallic compound was counted by observing the surface of the aluminum alloy foil using scanning electron microscope (SEM). The surface of the aluminum alloy foil was subjected to electropolishing to give a mirror state. Then, the reflected electron image was observed at a magnification of 1000 times for 30 visual fields. The particle number of the intermetallic compound was quantified by using an image analyzing device.

<Pinhole Density>

A coil with a width of 0.6 m and a length of 6000 m was made from the aluminum alloy foil which was performed with foil rolling until the foil reaches a thickness of 15 μm. The number of pinholes was observed using a surface inspection machine. The number of the pinholes observed was divided by the total surface area to give the number of pinholes per 1 m$^2$ unit area. This value was taken as the pinhole density. The pinhole density of less than $2.0 \times 10^{-3}$ pinholes/m$^2$ was considered acceptable and the pinhole density of $2.0 \times 10^{-3}$ pinholes/m$^2$ or more was determined as unacceptable.

<Whether or not Cut Occurs During Active-Material-Application Step>

Whether or not a cut occurred in a positive electrode material applied during an active-material-application step was visually inspected. The case without a cut was considered acceptable, and the case with a cut was determined as unacceptable.

<Whether or not Active Material Detaches>

The presence or absence of the active material detachment was visually inspected. When no detachment occurred, the case was considered acceptable. When at least some detachment occurred, the case was determined as unacceptable.

In Examples 1 to 12, no cut occurred during the active material application step, no detachment of the active material was observed, high electrical conductivity was obtained, and thus excellent evaluation result was achieved.

In Comparative Example 13, the high content of Si resulted in small particle number of fine intermetallic compound, insufficient strength before and after heat treatment at 120° C. for 24 hours or at 140° C. for 3 hours, thereby causing cut during the active material application step and detachment of the active material.

In Comparative Example 14, the low content of Fe resulted in insufficient strength before and after heat treatment at 120° C. for 24 hours, at 140° C. for 3 hours, or at 160° C. for 15 minutes, thereby causing cut during the active material application step and detachment of the active material.

In Comparative Example 15, the high content of Fe resulted in generation of many pinholes.

In Comparative Example 16, the high content of Cu resulted in too high work hardening, thereby causing cut during the foil rolling.

In Comparative Example 17, the high rolling reduction ratio during the cold rolling before the heat treatment at high temperature resulted in the decrease of the amount of cold rolling reduction from the thickness right after the heat treatment to the final thickness of the foil, insufficient strength before and after heat treatment at 120° C. for 24 hours, at 140° C. for 3 hours, or at 160° C. for 15 minutes, thereby causing cut during the active material application step and detachment of the active material.

In Comparative Example 18, the low temperature of the heating treatment resulted in a large amount of Fe dissolved in a supersaturated manner to precipitate, insufficient strength before and after heat treatment at 120° C. for 24 hours, at 140° C. for 3 hours, or at 160° C. for 15 minutes, thereby causing cut during the active material application step and detachment of the active material.

In Comparative Example 19, the short holding time for the heat treatment resulted in high solid solution content of Fe, thereby causing decrease in the electrical conductivity.

In Comparative Examples 20 and 21, the adoption of semi-continuous casting resulted in insufficient strength before and after heat treatment at 120° C. for 24 hours, at 140° C. for 3 hours, or at 160° C. for 15 minutes, thereby causing cut during the active material application step and detachment of the active material.

The invention claimed is:

1. A positive electrode, comprising:
    an electrode current collector comprising an aluminum foil consisting of 0.03 to 1.0 mass % (hereinafter referred to as %) of Fe, 0.01 to 0.2% of Si, 0.0001 to 0.2% of Cu, Al, and unavoidable impurities, and
    lithium containing metal oxide provided on the electrode current collector,
    wherein an electrical conductivity of the aluminum alloy foil is 57% IACS or higher, and a particle number of an intermetallic compounds having a maximum diameter length of 0.1 to 1.0 μm or longer is $1.0 \times 10^4$ particles/mm$^2$ or more; and
    tensile strength of an original sheet after final cold rolling is preferably 180 MPa or higher, 0.2% yield strength thereof is preferably 160 MPa or higher, and tensile strength is 170 MPa or higher, and 0.2% yield strength is 150 MPa or higher even when heat treatment at 120° C. for 24 hours, at 140° C. for 3 hours, or at 160° C. for 15 minutes is performed.

2. A method for manufacturing the positive electrode of claim 1, comprising the step of:
    applying lithium containing metal oxide onto an aluminum alloy foil, wherein the aluminum alloy foil is obtained by the method comprising the steps of:
    continuous casting an aluminum alloy sheet consisting of 0.03 to 1.0% of Fe, 0.01 to 0.2% of Si, 0.0001 to 0.2% of Cu, Al, and unavoidable impurities,
    performing cold rolling to the aluminum alloy sheet at a cold rolling reduction of 80% or lower, and
    performing heat treatment at 550 to 620° C. for 1 to 15 hours.

* * * * *

UNITED STATES PATENT AND TRADEMARK OFFICE
CERTIFICATE OF CORRECTION

PATENT NO. : 10,916,357 B2
APPLICATION NO. : 14/235748
DATED : February 9, 2021
INVENTOR(S) : Masakazu Seki et al.

It is certified that error appears in the above-identified patent and that said Letters Patent is hereby corrected as shown below:

On the Title Page

Item (73) Should read:
Assignees: UACJ Corporation, Tokyo (JP)
           UACJ Foil Corporation, Tokyo (JP)

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*